United States Patent [19]

Khouri et al.

[11] Patent Number: 5,115,042
[45] Date of Patent: May 19, 1992

[54] COPOLYMERS OF AMINE-TERMINATED POLYMERS AND ORTHO ESTER-CAPPED POLYPHENYLENE ETHERS

[75] Inventors: Farid F. Khouri, Clifton Park; Sterling B. Brown; John T. Jackman, both of Schenectady, all of N.Y.

[73] Assignee: General Electric Company, Schenectady, N.Y.

[21] Appl. No.: 727,209

[22] Filed: Jul. 9, 1991

Related U.S. Application Data

[63] Continuation-in-part of Ser. No. 567,575, Aug. 15, 1990, abandoned.

[51] Int. Cl.$^5$ .............. C08G 65/38; C08L 71/12; C08L 77/00; C07D 251/00
[52] U.S. Cl. .............. 525/397; 544/215; 544/219; 525/68; 525/92; 525/390; 525/905
[58] Field of Search .............. 525/397, 905, 390, 92, 525/68; 544/215, 219

[56] References Cited

U.S. PATENT DOCUMENTS 4,927,894  5/1990  Brown .............. 525/390

Primary Examiner—Melvyn I. Marquis
Assistant Examiner—Thomas Hamilton, III
Attorney, Agent, or Firm—William H. Pittman; James C. Davis, Jr.

[57] ABSTRACT

Ortho ester-capped polyphenylene ethers are prepared by the reaction of a polyphenylene ether with a reactive compound containing an ortho ester group, preferably a 4-(2-methoxy-2-methyl-1,3-dioxolan-4-yl)methyl group. Chlorotriazines containing the ortho ester substituent are particularly preferred as capping agents. The capped polyphenylene ethers form copolymer-containing compositions with polyamides and other polymers containing amine groups, particularly in the presence of a Lewis acid as catalyst.

23 Claims, No Drawings

COPOLYMERS OF AMINE-TERMINATED POLYMERS AND ORTHO ESTER-CAPPED POLYPHENYLENE ETHERS

This application is a continuation-in-part of copending application Serial No. 07/567,575, now abandoned.

This invention relates to reactively capped polyphenylene ethers and the preparation of copolymers therefrom.

The polyphenylene ethers are a widely used class of thermoplastic engineering resins characterized by excellent hydrolytic stability, dimensional stability, toughness, heat resistance and dielectric properties. However, they are deficient in certain other properties such as workability and solvent resistance. Therefore, there is a continuing search for means for modifying polyphenylene ethers to improve these other properties.

Among the means being studied are blending of polyphenylene ethers with certain other resinous materials such as polyamides. Blends of polyamides with polyphenylene ethers are, however, incompatible. Molded parts fabricated from such blends are generally brittle and may undergo catastrophic delamination upon impact.

Compatibilization of blends of polyphenylene ethers with polyamides may be achieved by several methods. A frequently preferred method is the formation of a copolymer of the polyphenylene ether with the polyamide; when present in the blend, said copolymer serves as a compatibilizer for the uncopolymerized constituents.

One method for preparing copolymers of polyphenylene ethers with polyamides is disclosed in copending, commonly owned application Ser. No. 07/351,905. This method comprises capping the polyphenylene ether by reaction with an epoxychlorotriazine such as 2-chloro-4,6-diglycidoxy-1,3,5-triazine, 2-chloro-4-(n-butoxy)-6-glycidoxy-1,3,5-triazine or 2-chloro-4-(2,4,6-trimethylphenoxy)-6-glycidoxy-1,3,5-triazine. Such capped polyphenylene ethers readily form copolymers with amine-terminated polymers such as polyamides, and blends containing such copolymers have numerous desirable properties including high impact and tensile strengths and structural integrity.

However, the use of epoxychlorotriazines as capping agents has certain disadvantages. Among these are the necessity to use compounds such as glycidol in the preparation of the epoxychlorotriazines. Glycidol is expensive, and also has carcinogenic properties. Interest continues, therefore, in the development of new capping reagents capable of forming polyphenylene ethers which are reactive with other polymers.

The present invention includes compositions comprising copolymers prepared from amine-terminated polymers such as polyamides and a class of reactively capped polyphenylene ethers. It also includes a method for producing such compositions.

The invention in one of its aspects is a method for preparing a copolymer-containing composition which comprises effecting reaction between at least one polymer containing amine groups and a capped polyphenylene ether containing ortho ester end groups of the formula

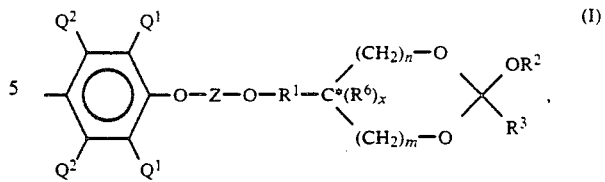

wherein:

each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms;

each $Q^2$ is independently hydrogen, halogen, primary or secondary lower alkyl, phenyl, haloalkyl, hydrocarbonoxy or halohydrocarbonoxy as defined for $Q^1$;

$R^1$ is a $C_{1-6}$ alkylene radical;

$R^2$ is a $C_{1-4}$ primary or secondary alkyl radical or is an alkylene radical forming a second 5- or 6-membered ring with $C^*$, and $R^3$ is a $C_{1-4}$ primary or secondary alkyl or $C_{6-10}$ aromatic radical, or $R^2$ and $R^3$ together with the atoms connecting them form a 5-, 6- or 7-membered ring;

$R^3$ is a $C_{1-4}$ primary or secondary alkyl radical;

$R^6$ is hydrogen or $C_{1-4}$ primary or secondary alkyl;

Z is a linking group which is substantially inert under capping conditions;

m is 0 or 1;

n is from 1 to 2-m; and x is 0 when R2 and C* form a ring and is otherwise 1.

Examples of primary lower alkyl groups (i.e., alkyl groups having up to 7 carbon atoms) suitable as $Q^1$ and $Q^2$ are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen.

By the term "ortho ester" is meant a compound in which one carbon atom is attached to another by a direct carbon-carbon bond, and to three further carbon atoms through oxygen. Such compounds can be considered to be esters of the hypothetical ortho acids R—C(OH)$_3$, wherein R is an organic radical. The existence of such ortho acids is for the most part unknown, since they immediately dehydrate to conventional carboxylic acids. However, esters of such acids are known and the method of this invention employs certain polymeric esters of this type.

In formula I, $R^1$ is a $C_{1-6}$ alkylene radical such as methylene, ethylene, propylene, trimethylene, pentamethylene or hexamethylene. It is most often methylene.

The $R^2$ radical may be a $C_{1-4}$ primary or secondary alkyl radical such as methyl, ethyl, n-propyl, isopropyl, n-butyl, isobutyl or secondary butyl. Primary radicals and especially the methyl radical are generally preferred.

It is also possible for $R^2$ to form a second 5-or 6-membered ring with other portions of the molecule. For this purpose, one of the carbon atoms in the ortho ester ring is designated $C^*$ to indicate its role as part of said second ring.

The $R^3$ value may be a $C_{1-4}$ primary or secondary alkyl radical as defined above for $R^2$, or a $C_{6-10}$ aromatic (preferably aromatic hydrocarbon) radical. Finally, it is possible for $R^2$ and $R^3$ together to form a 5-, 6- or 7-membered ring with the atoms connecting them. Thus, the invention includes certain spiro ortho ester-capped polyphenylene ethers.

The $R^6$ radical may be hydrogen or an alkyl radical similar to $R^2$ and $R^3$. It is preferably hydrogen.

The values of m and n depend on whether the cyclic ortho ester moiety is a 5-membered or 6-membered ring. In general, 5-membered rings are preferred; that is, m is 0 and n is 1. However, the invention also includes the use of compositions in which a 6-membered ring is present, which requires either that m and n both be 1 or that m be 0 and n be 2.

The value of the subscript x also depends on the cyclic structure of the ortho ester moiety. If C* is part of a ring structure with $R^2$, all four valences thereof are satisfied and x will be 0. If this is not the case, x will be 1.

The following are illustrative ortho ester moieties which may be present in formula I:

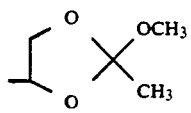
(II)

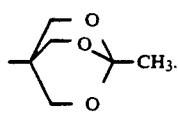
(III)

Formula II is the 4-(2-methoxy-2-methyl-1,3-dioxolanyl, radical and is usually preferred. Intermediates for preparation of such compounds include 4-hydroxymethyl-2-methoxy-2-methyl-1,3-dioxolane, which is obtainable by the reaction of glycerol and methyl orthoacetate. An improved method for the preparation of this and structurally related compounds in substantially pure form and the products thus obtained are disclosed and claimed in copending, commonly owned application Ser. No. 07/623,838. Formula III is the 4-(1-methyl-2,6,7-trioxabicyclo[2.2.2]octyl) radical; the methylol derivative thereof can be prepared by the reaction of ethyl orthoacetate with a substantially equimolar amount of pentaerythritol.

The Z radical may be any linking group which is substantially inert under the conditions of the polyphenylene ether capping reaction. It generally serves principally as a spacer between the ortho ester moiety and the polyphenylene ether chain; however, it may contain reactive groups of certain types, including groups displaceable by amine groups as described hereinafter.

Illustrative Z moieties include the following:

(IV)

(V)

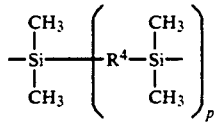
(VI)

(VII)

$$-CH_2-CH=CH-CH_2- \quad \text{(VIII)}$$

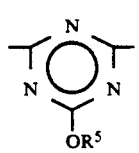
(IX)

$$-SO_2-R^4-SO_2- \quad \text{(X)}$$

(XI)

wherein p is 0 or 1, $R^4$ is a divalent aliphatic, alicyclic or aromatic radical and $R^5$ is an alkyl, cycloalkyl or aromatic radical or a radical of the formula

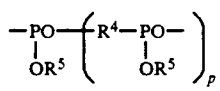

The triazine radicals of formula IX are often preferred by reason of their versatility as noted hereinafter.

The ortho ester-capped polyphenylene ethers are disclosed and claimed in copending, commonly owned application Ser. No. 07/566,025. They may be prepared by effecting reaction between a polyphenylene ether and an ortho ester of the formula

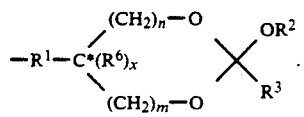
(XII)

wherein $R^{1-3}$, $R^6$, Z, C*, m, n and x are as previously defined. Compounds of formula XII may be prepared by the reaction of a compound of the formula $ZX_q$, wherein X is a good leaving group such as halide (especially chloride) and q is 2 or 3, with a hydroxy-substituted ortho ester of the formula

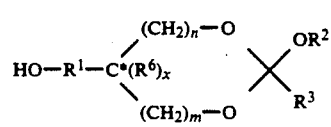
(XIII)

under conditions readily ascertainable by those skilled in the art. Alternatively, compounds in which Z contains carbamate groups (e.g., has formula V) may be prepared by the reaction of a diisocyanate with a substantially equivalent amount of an ortho ester of formula XIII.

The preferred compounds of formula XII are triazines having the formula

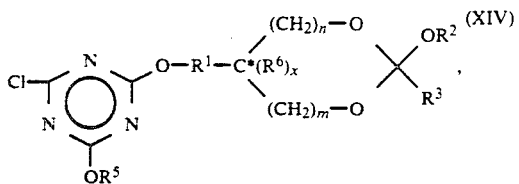

wherein $R^{1-3}$, $R^5$, $R^6$, $C^*$, m, n and x are as previously defined, especially those in which $R^1$ is methylene. Ortho ester-substituted triazines of formula XIV are disclosed and claimed in copending, commonly owned application Ser. No. 07/567,574.

The preferred identity of $R^5$ will depend to some extent on the reactivity desired for the capped polyphenylene ether and the nature of the other polymer with which copolymer formation is desired. Ortho ester groups are substantially more reactive with carboxylic acid groups than with amine groups. Thus, the formation of a copolymer between a capped polyphenylene ether of this invention and the amine group in an amine-terminated polyamide or the like will require the presence of a Lewis acid as catalyst when $R^5$ is itself an ortho ester group or is substantially non-reactive; e.g., when it is an alkyl radical or a hindered aromatic radical such as 2,6-xylyl or mesityl (2,4,6-trimethylphenyl).

When $R^5$ is a relatively unhindered aromatic radical (e.g., phenyl), uncatalyzed displacement thereof by the amine group can take place with the formation of a copolymer. Accordingly, capped polyphenylene ethers of the invention in which $R^5$ is phenyl or a similarly unhindered aromatic radical, optionally activated by at least one electron-withdrawing substituent, contain two groups capable of copolymer-forming reactions, one (the ortho ester group) with carboxylic acid groups and the other (the phenyl group) with amine groups.

The preparation of ortho ester-substituted chlorotriazines is illustrated by the following examples. All percentages in the examples herein are by weight.

EXAMPLE 1

A 1-liter round-bottomed flask equipped with a pressure equalizing addition funnel was flushed with nitrogen and charged with 41.5 grams (451 mmol.) of glycerol, 750 ml. of methylene chloride and 100 mg. of p-toluenesulfonic acid. Methyl orthoacetate, 56.9 grams (473 mmol.), was added over 5 minutes at room temperature, with stirring; stirring was continued for 18 hours after which 1 gram of anhydrous sodium carbonate was added and the mixture was stirred for one additional hour and filtered. The solvent was stripped under vacuum to yield 65 grams (97% of theoretical) of 4-hydroxymethyl-2-methoxy-2-methyl-1,3-dioxolane as a clear oil. Its molecular structure was confirmed by proton and carbon-13 nuclear magnetic resonance spectroscopy.

A 3-necked 500-ml. round-bottomed flask equipped with a magnetic stirrer, pressure equalizing addition funnel and thermometer was charged with 22.63 grams (123 mmol.) of cyanuric chloride, 17.54 grams (128.8 mmol.) of mesitol and 250 ml. of methylene chloride. The flask was cooled to 0° C. and 14.72 grams (184 mmol.) of 50% aqueous sodium hydroxide solution was added dropwise at 0°–5° C., with stirring. The reaction mixture was warmed to room temperature and stirring was continued for 85 minutes, after which the liquid (a solution of the desired mesitoxydichlorotriazine) was decanted from the precipitated solids and the flask was washed and recharged with the decanted liquid.

There was added three drops of a commercially available methyltrialkylammonium chloride in which the alkyl groups contained 8-10 carbon atoms, and the flask was cooled to 0° C. Triethylamine, 0.5 ml., and 20 grams (135 mmol.) of 4-hydroxymethyl-2-methoxy-2-methyl-1,3-dioxolane were added, after which 14.72 grams (184 mmol.) of 50% aqueous sodium hydroxide solution was introduced dropwise, with stirring and cooling to 0°–5° C. The mixture was warmed to room temperature and stirred overnight, after which the organic layer was separated, washed three times with distilled water, dried over anhydrous magnesium sulfate, filtered and vacuum stripped. There was obtained 48 grams (99% of theoretical) of the desired 2-chloro-4-(2-methoxy-2-methyl-1,3-dioxolanyl)methoxy-6-(2,4,6-trimethylphenoxy)-1,3,5-triazine, containing about 15% bis(2,4,6-trimehylphenoxy) chlorocyanurate as an impurity. The molecular structure was confirmed by proton nuclear magnetic resonance spectroscopy.

EXAMPLE 2

The procedure of Example 1 is repeated, substituting 1-methyl-4-hydroxymethyl-2,6,7-trioxabicyclo[2.2.2]octane on an equimolar basis for the substituted dioxolane. The bicyclooctane could be prepared by the reaction of ethyl orthoacetate with an equimolar amount of pentaerythritol. A similar product is obtained.

EXAMPLE 3

The procedure of Example 1 is repeated substituting phenol on an equimolar basis for the mesitol. The product is the desired 2-chloro-4-(2-methoxy-2-methyl-1,3-dioxolanyl)methoxy-6-phenoxy-1,3,5-triazine.

EXAMPLE 4

A 3-necked 500-ml. round-bottomed flask equipped with a magnetic stirrer, pressure equalizing addition funnel and thermometer was charged with 22.63 grams (123 mmol.) of cyanuric chloride and 250 ml. of methylene chloride. The flask was cooled to 0° C/ and 0.5 ml. of 2,6-lutidine, five drops of a commercially available methyltrialkylammonium chloride in which the alkyl groups contained 8-10 carbon atoms and 19.13 grams (129 mmol.) of 4-hydroxymethyl-2-methoxy-2-methyl-1,3-dioxolane were added, followed by dropwise addition of 11.8 grams (148 mmol.) of 50% aqueous sodium hydroxide solution at 0°–10° C., with stirring. Stirring was continued for 1 hour, after which 11.6 grams (123 mmol.) of phenol was added and an additional 11.8 grams of sodium hydroxide solution was introduced dropwise in the same manner.

The flask was warmed to room temperature and stirred overnight, after which 0.5 ml. of triethylamine was added. The organic layer was separated, diluted with further methylene chloride, washed three times with distilled water, dried over anhydrous magnesium sulfate, filtered and vacuum stripped. There was obtained 37 grams (85% of theoretical) of the desired 2-chloro-4-(2-methoxy-2-methyl-1,3-dioxolanyl)methoxy-6-phenoxy-1,3,5-triazine, containing about 27% diphenoxy chlorocyanurate as an impurity. The molecular structure was confirmed by proton nuclear magnetic resonance spectroscopy.

The polyphenylene ethers which may be capped with ortho esters of formula X encompass numerous variations and modifications all of which are applicable to the present invention, including but not limited to those described hereinafter.

The polyphenylene ethers comprise a plurality of structural units having the formula

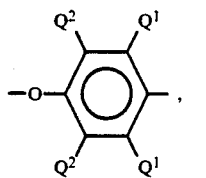

(XV)

wherein $Q^{1-2}$ are as previously defined. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent, provided substantial proportions of free hydroxy groups remain present. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.15–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, ω-hydroxyaromatic aldehydes, o-hydroxyazo compounds, β-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

The polyphenylene ethers which may be employed for the purposes of this invention include those which comprise molecules having at least one of the end groups of the formulas

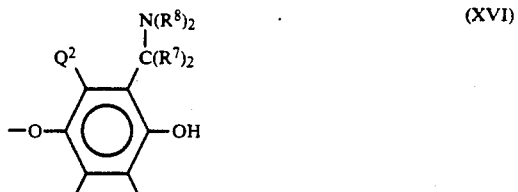

(XVI)

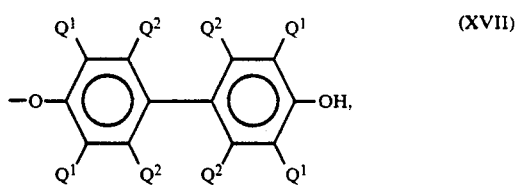

(XVII)

wherein $Q^1$ and $Q^2$ are as previously defined; each $R^8$ is independently hydrogen or a $C_{1-6}$ primary alkyl radical; and each $R^7$ is independently hydrogen or alkyl, with the proviso that the total number of carbon atoms in both $R^7$ radicals is 6 or less. Preferably, each $R^8$ is alkyl, especially methyl or n-butyl, and each $R^7$ is hydrogen.

Polymers containing the aminoalkyl-substituted end groups of formula XVI are typically obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending the aminoalkyl-substituted end groups may undergo various reactions, probably involving a quinone methide-type intermediate of the formula

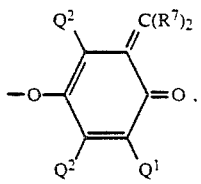

(XVIII)

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula XVII are often especially useful in the present invention. They are typically obtained from reaction mixtures in which a by-product diphenoquinone of the formula

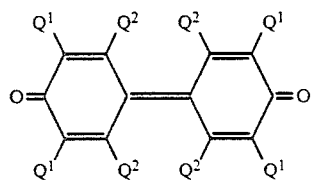

(XIX)

is present, especially in a copper-halide-secondary or tertiary amine system. In this regard, the disclosure of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas XVI and XVII. It should be understood, however, that other end groups may be present and that the invention in its broadest sense may not be dependent on the molecular structures of the polyphenylene ether end groups.

The use of polyphenylene ethers containing substantial amounts of unneutralized amino nitrogen may afford compositions with undesirably low impact strengths. The amino compounds include, in addition to the aforementioned aminoalkyl end groups, traces of amine (particularly secondary amine) in the catalyst used to form the polyphenylene ether.

The present invention therefore includes the use of polyphenylene ethers in which a substantial proportion of amino compounds has been removed or inactivated. Polymers so treated contain unneutralized amino nitrogen, if any, in amounts no greater than 800 ppm. and more preferably in the range of about 100–800 ppm.

A preferred method of inactivation is by extrusion of the polyphenylene ether at a temperature within the range of about 230°–350° C., with vacuum venting. This is preferably achieved in a preliminary extrusion step, by connecting the vent of the extruder to a vacuum pump capable of reducing the pressure to about 200 torr or less.

It is believed that this inactivation method aids in the removal by evaporation of any traces of free amines (predominantly secondary amines) in the polymer, including amines generated by conversion of aminoalkyl end groups to quinone methides of the type represented by formula XVIII.

It will be apparent to those skilled in the art from the foregoing that the polyphenylene ethers contemplated for use in the present invention include all those presently known, irrespective of variations in structural units or ancillary chemical features.

The reaction between the polyphenylene ether and the ortho ester employed as capping agent may be conducted under conditions which are conventional in the light of the structure of Z. For example, when Z is a triazine moiety the reaction may take place at temperatures from about −10° to about 100° C. in the presence of an alkaline reagent such as sodium hydroxide, most often in the form of an aqueous solution. It is frequently preferred to employ a relatively non-polar solvent such as methylene chloride, toluene, xylene or chlorobenzene. It is also frequently advantageous to employ a phase transfer catalyst. Any of such catalysts which are stable and effective under the prevailing reaction conditions may be used; those skilled in the art will readily perceive which ones are suitable. Particularly preferred are the tetraalkylammonium chlorides wherein at least two alkyl groups per molecule, typically two or three, contain about 5-20 carbon atoms.

The proportions of ortho ester and polyphenylene ether may be varied widely, depending upon the proportion of copolymer desired in the blend to be compatibilized. Molar ratios of ortho ester to polyphenylene ether, the latter in terms of non-hydrogen bonded hydroxy end groups, are typically in the range of about 0.1–3.0:1. The molar ratio of base to polyphenylene ether is usually in the range of about 1–2:1, and the phase transfer catalyst (when employed) is present in a minor amount effective to catalyze the reaction, such amounts being known in the art as readily determinable by simple experimentation.

Following completion of the capping reaction, the reaction mixture can be worked up by conventional operations, typically including neutralization of remaining alkaline reagent with an acidic material such as carbon dioxide and precipitation of the product from solution by addition of a non-solvent. Among the non-solvents which may be employed are methanol, 1-propanol, acetone, acetonitrile and mixtures thereof. It is also possible to employ the solution of the capped polyphenylene ether directly in copolymer formation, as by a reactive extrusion process leading to removal of the solvent by volatilization or accompanied by addition of an anti-solvent and isolation of a slurry as the extrudate.

The preparation of the ortho ester-capped polyphenylene ethers is illustrated by the following examples. In each example, the polyphenylene ether employed was a commercially available poly(2,6-dimethyl-1,4-phenylene ether) having an intrinsic viscosity in chloroform at 25° C. of 0.40 dl./g. Molar proportions of polyphenylene ether are in terms of non-hydrogen bonded hydroxy end groups.

EXAMPLE 5

A 3-necked 12-liter flask equipped with a paddle stirrer, thermometer and nitrogen inlet was charged with a solution of 1100 grams (64.7 mmol.) of polyphenylene ether in 5.5 liters of toluene. There was added 4.1 grams of the methyltrialkylammonium chloride of Example 1 and 7.77 grams (97 mmol.) of 50% aqueous sodium hydroxide solution. The mixture was stirred vigorously for 15 minutes, whereupon 48.5 grams (122.6 mmol.) of the product of Example 1 was added. Stirring was continued for 35 minutes, after which remaining base was neutralized by bubbling gaseous carbon dioxide through the solution for 7 minutes. The solution was poured into an excess of methanol and the polymer which precipitated was dried at 110° C. in vacuum. There was obtained 1096 grams of the desired ortho ester-capped polyphenylene ether. Its structure was confirmed by proton nuclear magnetic resonance and Fourier transform infrared spectroscopy.

EXAMPLE 6

The procedure of Example 5 is repeated, substituting the product of Example 2 on an equimolar basis for that of Example 1. A similar capped polymer is obtained.

EXAMPLE 7

The procedure of Example 5 is repeated, substituting the product of Example 3 on an equimolar basis for that of Example 1. A similar capped polymer is obtained.

EXAMPLE 8

A 3-necked 5-liter flask equipped with a paddle stirrer, thermometer and nitrogen inlet was charged with a solution of 550 grams (32.4 mmol.) of polyphenylene ether in 3 liters of toluene. There was added 5.5 grams of the methyltrialkylammonium chloride of Example 1 and 3.88 grams (48.5 mmol.) of 50% aqueous sodium hydroxide solution. The mixture was stirred vigorously for 30 minutes, whereupon a solution of 25 grams (70.7 mmol.) of the product of Example 4 in 100 ml. of methylene chloride was added. Stirring was continued for 30 minutes, after which remaining base was neutralized by bubbling gaseous carbon dioxide through the solution for 10 minutes. The solution was poured into an excess of methanol and the polymer which precipitated was dried at 110° C. in vacuum. The product was the desired ortho ester-capped polyphenylene ether. Its structure was confirmed by proton nuclear magnetic resonance and Fourier transform infrared spectroscopy.

Any polymer (other than a polyphenylene ether) containing amine groups may be employed in the present invention. Polymers with amine end groups are preferred, with polyamides being particularly preferred. Included are those prepared by the polymerization of a monoamino-monocarboxylic acid or a lactam thereof having at least 2 carbon atoms between the amino and carboxylic acid group, of substantially equimolar proportions of a diamine which contains at least 2 carbon atoms between the amino groups and a dicarboxylic acid, or of a monoaminocarboxylic acid or a lactam thereof as defined above together with substantially equimolar proportions of a diamine and a dicarboxylic acid. (The term "substantially equimolar" proportions includes both strictly equimolar proportions and slight departures therefrom which are involved in conventional techniques for stabilizing the viscosity of the resultant polyamides.) The dicarboxylic acid may be used in the form of a functional derivative thereof, for example, an ester or acid chloride.

Examples of the aforementioned monoamino-monocarboxylic acids or lactams thereof which are useful in preparing the polyamides include those compounds containing from 2 to 16 carbon atoms between the amino and carboxylic acid groups, said carbon, atoms forming a ring containing the —CO—NH— group in the case of a lactam. As particular examples of aminocarboxylic acids and lactams there may be mentioned ε-aminocaproic acid, butyrolactam, pivalolactam, ε-caprolactam, capryllactam, enantholactam, undecanolactam, dodecanolactam and 3- and 4-aminobenzoic acids.

Diamines suitable for use in the preparation of the polyamides include the straight chain and branched chain alkyl, aryl and alkaryl diamines. Illustrative diamines are trimethylenediamine, tetramethylenediamine, pentamethylenediamine, octamethylenediamine, hexamethylenediamine (which is often preferred), trimethylhexamethylenediamine, m-phenylenediamine and m-xylylenediamine.

The dicarboxylic acids may be represented by the formula

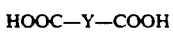

wherein Y is a divalent aliphatic or aromatic group containing at least 2 carbon atoms. Examples of aliphatic acids are sebacic acid, octadecanedioic acid, suberic acid, glutaric acid, pimelic acid and adipic acid.

Both crystalline and amorphous polyamides may be employed, with the crystalline species often being preferred by reason of their solvent resistance. Typical examples of the polyamides or nylons, as these are often called, include, for example, polyamide-6 (polycaprolactam), 66 (polyhexamethylene adipamide), 11, 12, 63, 64, 6/10 and 6/12 as well as polyamides from terephthalic acid and/or isophthalic acid and trimethylhexamethylenediamine; from adipic acid and m-xylylenediamines; from adipic acid, azelaic acid and 2,2-bis(p-aminophenyl)propane or 2,2-bis-(p-aminocyclohexyl)propane and from terephthalic acid and 4,4'-diaminodicyclohexylmethane. Mixtures and/or copolymers of two or more of the foregoing polyamides or prepolymers thereof, respectively, are also within the scope of the present invention. Preferred polyamides are polyamide-6, 46, 66, 11 and 12, most preferably polyamide-66.

The reaction conditions for forming copolymer-containing compositions by the method of this invention depend upon the presence and nature of the $R^5$ moiety in the ortho ester-capped polyphenylene ether. If $R^5$ is present and is phenyl or a similar unhindered aryl radical, capable of displacement by an amine group, or is an ortho ester group, simple solution or melt blending operations such as those described hereinafter are effective. On the other hand, if $R^5$ is a relatively non-displaceable moiety such as an alkyl or hindered aryl radical, the reaction also requires the presence of a Lewis acid as catalyst.

A wide variety of Lewis acids may be employed as catalyst. They include, for example, tetraalkyl titanates, triarylmethyl salts, quaternary ammonium salts, triaryl phosphites and acidic alkaline earth metal salts. The preferred catalysts in most circumstances are the triphenylmethyl hexachloroantimonates, quaternary ammonium halides, triaryl phosphites and alkaline earth metal chlorides. Catalyst proportions are generally in the range of about 0.1-2.0%, based on ortho ester-capped polyphenylene ether.

Copolymer-containing compositions prepared by the method described herein are another aspect of the invention. For their preparation, a blending method which results in the formation of an intimate blend is preferred. Suitable procedures include solution blending, although such procedures are of limited applicability to many polyamides by reason of their insolubility in most common solvents. For this reason and because of the availability of melt blending equipment in commercial polymer processing facilities, melt reaction procedures are generally preferred. Conventional melt blending procedures and equipment may be employed, with extrusion often preferred because of its relative convenience and particular suitability. Typical reaction temperatures are in the range of about 175°-350° C.

Those skilled in the art will be familiar with blending methods and apparatus capable of intimately blending resinous constituents, especially by kneading. They are exemplified by disc-pack processors and various types of extrusion equipment. Illustrations of the latter are continuous mixers; single screw kneading extruders; counterrotating, non-intermeshing twin screw extruders having screws which include forward-flighted compounders, cylindrical bushings and/or left-handed screw elements; corotating, intermeshing twin screw extruders; and extruders having screws which include at least one and preferably at least two sections of kneading block elements.

In addition to copolymer, the copolymer-containing compositions of this invention may also contain unreacted polyphenylene ether. This will include any polyphenylene ether molecules having only hydrogen bonded end groups, as well as other polyphenylene ether which is unfunctionalized as a result of incomplete capping, which is functionalized but fails to react with polyamide or which is introduced in unfunctionalized form. In any event, molded parts produced from said compositions are generally ductile and have higher impact strengths than those produced from simple blends, which are incompatible and often exhibit brittleness or delamination as previously described.

It is also contemplated to include in the blending step impact modifiers compatible with either or both of the polyphenylene ether and the polyamide.

Impact modifiers for polyphenylene ether compositions are well known in the art. They are most often elastomeric polymers, typically derived from one or more monomers selected from the group consisting of olefins, vinyl aromatic monomers, acrylic and alkylacrylic acids and their ester derivatives as well as conjugated dienes. Especially preferred impact modifiers are the rubbery high molecular weight materials including natural and synthetic polymeric materials showing elasticity at room temperature. They include both homopolymers and copolymers, including random, block, radial block, graft and core-shell copolymers as well as combinations thereof.

Polyolefins or olefin-based copolymers employable in the invention include low density polyethylene, high density polyethylene, linear low density polyethylene, isotactic polypropylene, poly(1-butene), poly(4-methyl-1-pentene), propylene-ethylene copolymers and the like. Additional olefin copolymers include copolymers of one or more α-olefins, particularly ethylene, with copolymerizable monomers including, for example, vinyl acetate, acrylic acid and alkylacrylic acids as well as the ester derivatives thereof including, for example, ethyl acrylate, methyl methacrylate and the like. Also suitable are the ionomer resins, which may be wholly or partially neutralized with metal ions.

A particularly useful class of impact modifiers are those derived from the vinyl aromatic monomers. These include AB and ABA type block and radial block copolymers and vinyl aromatic conjugated diene core-shell graft copolymers.

An especially preferred subclass of vinyl aromatic monomer-derived resins is the block copolymers comprising monoalkenyl arene (usually styrene) blocks and conjugated diene (e.g., butadiene or isoprene) or olefin (e.g., ethylene-propylene, ethylene-butylene) blocks and represented as AB and ABA block copolymers. The conjugated diene blocks may be partially or entirely hydrogenated, whereupon the properties are similar to the olefin block copolymers.

Suitable AB type block copolymers are disclosed in, for example, U.S. Pat. Nos. 3,078,254; 3,402,159; 3,297,793; 3,265,765 and 3,594,452 and UK Patent 1,264,741, all incorporated herein by reference. Exemplary of typical species of AB block copolymers are polystyrene-polybutadiene (SBR), polystyrene-polyisoprene and poly(alpha-methylstyrene)-polybutadiene. Such AB block copolymers are available commercially from a number of sources, including Phillips Petroleum under the tradename SOLPRENE.

Additionally, ABA triblock copolymers and processes for their production as well as hydrogenation, if desired, are disclosed in U.S. Pat. Nos. 3,149,182; 3,231,635; 3,462,162; 3,287,333; 3,595,942; 3,694,523 and 3,842,029, all incorporated herein by reference. Examples of triblock copolymers include polystyrene-polybutadiene-polystyrene (SBS), polystyrene-polyisoprene-polystyrene (SIS), poly(α-methylstyrene)-polybutadiene-poly(α-methylstyrene) and poly(α-methylstyrene)-polyisoprene-poly(α-methylstyrene). Particularly preferred triblock copolymers are available commercially as CARIFLEX®, KRATON D® and KRATON G® from Shell.

Another class of impact modifiers is derived from conjugated dienes. While many copolymers containing conjugated dienes have been discussed above, additional conjugated diene modifier resins include, for example, homopolymers and copolymers of one or more conjugated dienes including, for example, polybutadiene, butadiene-styrene copolymers, isoprene-isobutylene copolymers, chlorobutadiene polymers, butadiene-acrylonitrile copolymers, polyisoprene, and the like. Ethylene-propylene-diene monomer rubbers may also be used. These EPDM's are typified as comprising predominantly ethylene units, a moderate amount of propylene units and up to about 20 mole percent of non-conjugated diene monomer units. Many such EPDM's and processes for the production are disclosed in U.S. Pat. Nos. 2,933,480; 3,000,866; 3,407,158; 3,093,621 and 3,379,701, incorporated herein by reference.

Other suitable impact modifiers are the core-shell type graft copolymers. In general, these have a predominantly conjugated diene rubbery core or a predominantly crosslinked acrylate rubbery core and one or more shells polymerized thereon and derived from monoalkenylarene and/or acrylic monomers alone or, preferably, in combination with other vinyl monomers. Such core-shell copolymers are widely available commercially, for example, from Rohm and Haas Company under the trade names KM-611, KM-653, KM-330, and are described in U.S. Pat. Nos. 3,808,180; 4,034;013; 4,096,202; 4,180,494 and 4,292,233.

Also useful are the core-shell copolymers wherein an interpenetrating network of the resins employed characterizes the interface between the core and shell. Especially preferred in this regard are the ASA type copolymers available from General Electric Company and sold as GELOY ™ resin and described in U.S. Pat. No. 3,944,631.

In addition, there may be employed the above-described polymers and copolymers having copolymerized therewith or grafted thereon monomers having functional groups and/or polar or active groups. Finally, other suitable impact modifiers include Thiokol rubber, polysulfide rubber, polyurethane rubber, polyether rubber (e.g., polypropylene oxide), epichlorohydrin rubber, ethylene-propylene rubber, thermoplastic polyester elastomers and thermoplastic ether-ester elastomers.

There may also be present in the copolymer-containing compositions of this invention conventional ingredients such as fillers, flame retardants, pigments, dyes, stabilizers, anti-static agents, crystallization aids, mold release agents and the like, as well as resinous components not previously discussed.

The proportions of polyphenylene ether, polyamide and other resinous materials such as impact modifier (if present) are not critical; they may be widely varied to provide compositions having the desired properties. Most often, the polyphenylene ether is employed in an amount in the range of about 5–95%, preferably about 15–50%, of the composition by weight. Impact modifiers such as diblock or triblock copolymers are usually present in an amount up to about 25 parts per 100 parts of polyphenylene ether.

The preparation of the copolymer-containing compositions of this invention is illustrated by the following examples. All parts and percentages are by weight.

EXAMPLES 9–14

Dry parts of the product of Example 5, 41 parts of a commercially available polyamide-66, 10 parts of a commercially available triblock copolymer with polystyrene end blocks having weight average molecular weights of 29,000 and a hydrogenated butadiene midblock having a weight average molecular weight of 116,000 and various percentages (based on capped polyphenylene ether) of Lewis acids as catalysts were prepared and extruded at temperatures in the range of 120°–288° C., with vacuum venting.

The extrudates were the desired copolymer-containing compositions; they were pelletized, dried for 4 hours at 110°–C. and molded into test specimens which were equilibrated for 24 hours at 50% humidity and tested for notched Izod impact strength (ASTM procedure D256). The results are given in the following table, in comparison with a control in which no catalyst was employed.

|  | Example | | | | | | Control |
|---|---|---|---|---|---|---|---|
|  | 9 | 10 | 11 | 12 | 13 | 14 |  |
| Catalyst, %: | | | | | | | |
| Tetraisopropyl titanate | 0.9 | — | — | — | — | — | — |
| Triphenylmethyl hexachloroantimonate | — | 1.8 | — | — | — | — | — |
| Tetra-n-butyl-ammonium bromide | — | — | 2.0 | 1.0 | — | — | — |
| Triphenyl phosphite | — | — | — | — | 1.0 | — | — |
| Magnesium chloride | — | — | — | — | — | 0.3 | — |
| Izod impact strength, joules/m. | 59 | 106 | 107 | 200 | 128 | 145 | 48 |

EXAMPLE 15

The procedure of Examples 9–14 was repeated, except that the product of Example 8 was substituted on an equal weight basis for that of Example 5 and no catalyst was employed. The product had an Izod impact strength of 204 joules/m.

What is claimed is:

1. A method for preparing a copolymer-containing composition which comprises effecting reaction between at least one polymer containing amine groups and a capped polyphenylene ether containing ortho ester end groups of the formula

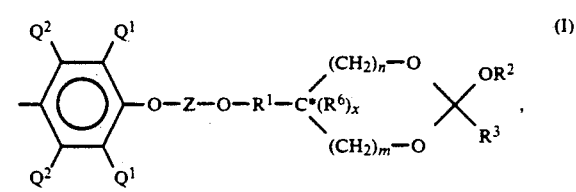

wherein:
each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms;
each $Q^2$ is independently hydrogen, halogen, primary or secondary lower alkyl, phenyl, haloalkyl, hydrocarbonoxy or halohydrocarbonoxy as defined for $Q^1$;
$R^1$ is a $C_{1-6}$ alkylene radical;
$R^2$ is a $C_{1-4}$ primary or secondary alkyl radical, or is an alkylene radical forming a 5- or 6-membered ring with C*, and $R^3$ is a $C_{1-4}$ primary or secondary alkyl or $C_{6-10}$ aromatic radical, or $R^2$ and $R^3$ together with the atoms connecting them form a 5-, 6- or 7-membered ring;
$R^6$ is hydrogen or $C_{1-4}$ primary or secondary alkyl;
Z is a linking group which is substantially inert under capping conditions;
m is 0 or 1;
n is from 1 to 2-m; and
x is 0 when $R^2$ and C* form a ring and is otherwise 2. A method according to claim 1 wherein the polymer containing amine groups is a polyamide.

3. A method according to claim 2 wherein the polyphenylene ether is a poly(2,6-dimethyl-1,4phenylene ether).

4. A method according to claim 3 wherein Z has one of the formulas

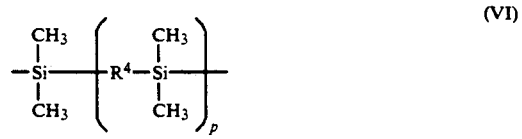

-continued

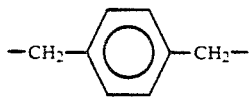 (VII)

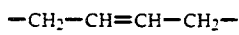 (VIII)

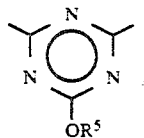 (IX)

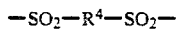 (X)

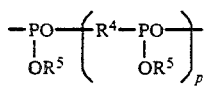 (XI)

wherein p is 0 or 1; $R^4$ is a divalent aliphatic, alicyclic or aromatic radical and $R^5$ is an alkyl, cycloalkyl or aromatic radical or a radical of the formula

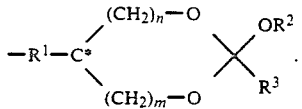

5. A method according to claim 4 wherein the polyamide is a polyamide-6 or a polyamide-66.

6. A method according to claim 4 wherein Z has formula IX and $R^5$ is an unhindered aromatic radical.

7. A method according to claim 6 wherein $R^1$ is methylene, $R^3$ is methyl and $R^6$ is hydrogen.

8. A method according to claim 7 wherein m is 0 and n is 1.

9. A method according to claim 8 wherein $R^2$ is methyl.

10. A method according to claim 9 wherein $R^5$ is phenyl.

11. A method according to claim 4 wherein Z has formula IX, $R^5$ is an alkyl or hindered aromatic radical and the reaction is conducted in the presence of a Lewis acid as catalyst.

12. A method according to claim 11 wherein Z has formula IX and $R^5$ is an unhindered aromatic radical.

13. A method according to claim 12 wherein $R^1$ is methylene and $R^3$ is methyl.

14. A method according to claim 13 wherein m is 0 and n is 1.

15. A method according to claim 14 wherein $R^2$ is methyl.

16. A method according to claim 15 wherein $R^5$ is 2,4,6-trimethylphenyl.

17. A method according to claim 16 wherein the catalyst is a tetraalkyl titanate, triarylmethyl salt, quaternary ammonium salt, triaryl phosphite or alkaline earth metal salt.

18. A method according to claim 17 wherein an impact modifier is also present.

19. A copolymer-containing composition prepared by the method of claim 1.

20. A copolymer-containing composition prepared by the method of claim 5.

21. A copolymer-containing composition prepared by the method of claim 9.

22. A copolymer-containing composition prepared by the method of claim 15.

23. A copolymer-containing composition prepared by the method of claim 18.

* * * * *